United States Patent
Zhu et al.

(10) Patent No.: US 12,499,058 B2
(45) Date of Patent: Dec. 16, 2025

(54) METHODS AND CORRESPONDING COMPUTING DEVICES FOR MANAGING TRANSLATION LOOKASIDE BUFFER IN COMPUTING DEVICE

(71) Applicant: ALIPAY (HANGZHOU) INFORMATION TECHNOLOGY CO., LTD., Zhejiang (CN)

(72) Inventors: Bojun Zhu, Hangzhou (CN); Shuang Liu, Hangzhou (CN); Shoumeng Yan, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/679,933

(22) Filed: May 31, 2024

(65) Prior Publication Data

US 2024/0403226 A1 Dec. 5, 2024

(30) Foreign Application Priority Data

Jun. 2, 2023 (CN) .......................... 202310652093.5

(51) Int. Cl.
*G06F 12/1036* (2016.01)
*G06F 9/455* (2018.01)

(52) U.S. Cl.
CPC ...... *G06F 12/1036* (2013.01); *G06F 9/45558* (2013.01); *G06F 2009/45583* (2013.01); *G06F 2009/45591* (2013.01)

(58) Field of Classification Search
CPC ............. G06F 12/1036; G06F 9/45558; G06F 2009/45583; G06F 2009/45591; G06F 12/1027; G06F 12/14; G06F 2212/1052; G06F 2212/683; G06F 21/53
USPC ............................................ 711/6, 1
See application file for complete search history.

(56) References Cited

U.S. PATENT DOCUMENTS

| 2022/0019698 A1* | 1/2022 | Durham | ................. H04L 9/0841 |
| 2023/0098117 A1* | 3/2023 | Wang | ...................... G06F 21/75 726/23 |

FOREIGN PATENT DOCUMENTS

CN 117494108 2/2024

\* cited by examiner

*Primary Examiner* — Hosain T Alam
*Assistant Examiner* — Zubair Ahmed
(74) *Attorney, Agent, or Firm* — Fish & Richardson P.C.

(57) ABSTRACT

For managing a translation lookaside buffer (TLB), an example computing device is deployed with virtual machines (VMs) by using a virtual machine monitor and has multiple CPU cores, where the VMs include a common VM running a common execution environment and a secure VM running a trusted execution environment (TEE) instance. In an example, in response to a target request for modifying a secure memory, the common execution environment sends an inter-processor interrupt (IPI) to one or more CPU cores that run the secure VM. Control data corresponding to the secure VM include a TLB control field set to a target value that indicates that all TLBs of the VM are flushed when exiting from the secure VM. In response to the IPI, the one or more CPU cores exit from a secure mode, and flushes all TLBs of the VM based on the target value.

20 Claims, 8 Drawing Sheets

METHODS AND CORRESPONDING COMPUTING DEVICES FOR MANAGING TRANSLATION LOOKASIDE BUFFER IN COMPUTING DEVICE

CROSS-REFERENCE TO RELATED APPLICATIONS

This application claims priority to Chinese Patent Application No. 202310652093.5, filed on Jun. 2, 2023, which is hereby incorporated by reference in its entirety.

TECHNICAL FIELD

One or more embodiments of this specification relate to TEE-supported computing devices, and in particular, to methods and corresponding computing devices for managing a translation lookaside buffer in a computing device.

BACKGROUND

With development of computing technologies in various industries and an increase of cloud and end users, people store numerous data in various computer devices. Along with the development of the industry, people pay increasing attention to security of devices and data. To ensure the security of devices and data, architecture vendors respectively have proposed their own solutions. For example, ARM proposed the TrustZone technology, AMD proposed the Secure Encrypted Virtualization (SEV) technology, and Intel proposed the Software Guard Extensions (SGX) technology. These solutions provide users with a secure and trusted execution environment (TEE) for secretly storing and processing data to protect the data from damages caused by untrusted applications.

The provision of the trusted execution environment (TEE) relies on effective management of memory permissions. To speed up translation of a virtual address to a physical address of a memory page, a translation lookaside buffer (TLB) is used in a CPU to cache a page table. Therefore, the TLB also stores memory-related information, which affects memory reading.

Therefore, it is expected to effectively manage the TLB to ensure memory security for the TEE.

SUMMARY

One or more embodiments of this specification describe solutions for managing a TLB in a computing device so as to ensure that a corresponding TLB entry is flushed when a secure memory is modified, thereby improving memory security for a TEE.

According to a first aspect, a method for managing a TLB in a computing device is provided. The computing device is deployed with a plurality of virtual machines by using a virtual machine monitor, the plurality of virtual machines include a common virtual machine running a common execution environment and a secure virtual machine running a TEE instance, and the computing device has a plurality of CPU cores; and the method includes: in response to a target request for modifying a secure memory, sending, by the common execution environment, an inter-processor interrupt (IPI) to one or more CPU cores that run the secure virtual machine, where control data corresponding to the secure virtual machine include a TLB control field, the TLB control field is set to a target value, and the target value indicates that all TLBs of the virtual machine are flushed when exiting from the secure virtual machine; and in response to the IPI, exiting, by the one or more CPU cores, from a secure mode in which the secure virtual machine runs, and flushing all TLBs of the corresponding virtual machine based on an indication of the target value.

In some embodiments, the control data are virtual machine control block (VMCB) data stored in a register corresponding to a CPU core.

According to some embodiments, the control data include virtual machine exit information, the virtual machine exit information is used to indicate an event that causes to exit from the virtual machine, and the virtual machine exit information is set to include an inter-processor interrupt (IPI).

According to some implementations, the target request relates to a first TEE instance, the virtual machine monitor includes a tracking module, and the tracking module maintains a first parameter group corresponding to the first TEE instance, where the first parameter group includes a state parameter used to indicate whether TLB flushing is completed. The method further includes: in response to the target request, updating, by the tracking module, the first parameter group by tracking switching of the one or more CPU cores with respect to the secure mode; and verifying, by the virtual machine monitor, whether the state parameter has a first value, and when the verification succeeds, validating memory modification corresponding to the target request, where the first value indicates that TLB flushing is completed.

In some embodiments, before sending the inter-processor interrupt (IPI), the above-mentioned method further includes: in response to the target request, setting a startup state for the first TEE instance to a first state indicating that start is not made, and setting the state parameter to a second value, where the second value indicates that TLB flushing is not completed.

Further, in response to that the startup state is the first state, the virtual machine monitor changes the startup state to a second state indicating that start is made, and initializes the first parameter group.

In some embodiments, the first parameter group further includes a first parameter indicating a quantity of cores that need to perform TLB flushing, and the first parameter is initially set to be equal to a quantity of threads of the first TEE instance that run in the secure mode at that time. Correspondingly, the tracking module updates the first parameter group, specifically including: updating the first parameter in response to switching of a target CPU core with respect to the secure mode, where the target CPU core is a CPU core running the first TEE instance among the one or more CPU cores; and setting the state parameter to the first value in response to that the first parameter is updated to 0.

In some embodiments, the first parameter group further includes a second parameter indicating whether the target CPU core needs to perform TLB flushing, and an initial value of the second parameter is a third value indicating that flushing needs to be performed.

Correspondingly, updating the first parameter can include: in response to that the target CPU core exits the secure mode, decreasing each of a value of the first parameter and the quantity of threads by 1 if a current value of the second parameter is the third value; otherwise, retaining the value of the first parameter and decreasing the quantity of threads by 1.

Updating the first parameter can further include: in response to that the target CPU core switches to the secure mode, increasing the quantity of threads by 1, and setting the second parameter to a fourth value, where the fourth value indicates that flushing does not need to be performed.

According to some implementations, the state parameter includes a first state parameter corresponding to first-type memory modification, and a second state parameter corresponding to second-type memory modification, and the first-type memory modification and the second-type memory modification respectively correspond to memory modification initiated by a normal world operating system and memory modification initiated by a TEE instance.

Correspondingly, the verifying, by the virtual machine monitor, whether the state parameter has a first value includes: if the target request relates to first-type memory modification, verifying whether the first state parameter has the first value; and if the target request relates to second-type memory modification, verifying whether the second state parameter has the first value.

According to a second aspect, a computing device is provided, where the computing device is deployed with a plurality of virtual machines by using a virtual machine monitor, the plurality of virtual machines include a common virtual machine running a common execution environment and a secure virtual machine running a TEE instance, and the computing device has a plurality of CPU cores; the common virtual machine is configured to: in response to a target request for modifying a secure memory, send an inter-processor interrupt (IPI) to one or more CPU cores that run the secure virtual machine, where control data corresponding to the secure virtual machine include a TLB control field, the TLB control field is set to a target value, and the target value indicates that all TLBs of the virtual machine are flushed when exiting from the secure virtual machine; and the one or more CPU cores are configured to: in response to the IPI, exit from a secure mode in which the secure virtual machine runs, and flush all TLBs of the corresponding virtual machine based on an indication of the target value.

According to a third aspect, a computing device is provided, including a storage device and a processor. The storage device stores executable code, and the processor executes the executable code to implement the method according to the first aspect.

In the solutions provided in some embodiments of this specification, when a secure memory needs to be modified, an inter-processor interrupt (IPI) is used to cause a CPU core running the TEE to exit the secure virtual machine. Control data of the virtual machine are set in advance such that the hardware flushes the TLB when exiting from the secure virtual machine. Further, the tracking module tracks a world switching state of a secure world CPU so as to ensure that in a tracking interval, a world switching occurs at least once on each secure world CPU that runs the current TEE. However, whenever the CPU core exits the secure world, TLB flushing is performed. Therefore, the tracking module tracks the world switching of the CPU core to ensure that the corresponding CPU core correctly performs TLB flushing.

BRIEF DESCRIPTION OF DRAWINGS

To describe the technical solutions in some embodiments of this application more clearly, the following briefly describes the accompanying drawings needed for describing the embodiments. Clearly, the accompanying drawings in the following descriptions show merely some embodiments of this application, and a person of ordinary skill in the art can still derive other accompanying drawings from these accompanying drawings without creative efforts.

DESCRIPTION OF EMBODIMENTS

The solutions provided in this specification are described below with reference to the accompanying drawings.

Before the solutions in some embodiments of this specification is described in detail, a memory access mechanism and a secure memory management mechanism corresponding to a TEE are first described.

As known by a person skilled in the art, a central processing unit (CPU) provides a pagination feature for software. The software can flexibly manage a memory by using this feature. After the pagination function is enabled, address space of the memory is divided into virtual address space and physical address space. A mapping relationship from a virtual address to a physical address is recorded in a data structure of a page table. In addition, the page table further records more information such as a memory access permission for each virtual memory page. In most cases, a program uses a virtual memory address to perform a memory access operation. During memory access, translation from a virtual address to a physical address is completed by a hardware module such as a memory management unit (MMU). The MMU uses the virtual address as an index, obtains a physical address and an access permission of an object by querying a page table currently used by the CPU, and performs a permission check based on a current access behavior. After the permission check succeeds, the CPU loads data pointed by the physical address into a corresponding register.

With a feature of temporal locality of memory access by a program, the CPU introduces a page table cache (translation lookaside buffer, TLB). Before accessing a memory page in a page table, the MMU hardware first queries the TLB. If the TLB already includes the address translation relationship, the MMU does not need to continue to access the page table. Therefore, using the TLB can reduce memory access times based on the page table, and speed up address translation.

In addition, many vendors provide solutions of a trusted execution environment (TEE) at present. The TEE is a secure running area provided by hardware or software for an application. Software and hardware outside the area cannot access or correctly modify real content of data in the area. With this feature, even if program code outside the TEE has a vulnerability that can be exploited by an attacker, security of a program and data in the TEE can be ensured. The trusted execution environment generally provides security features such as data privacy, data integrity, and identity verifiability for a processing program of sensitive data.

The functions of the TEE are implemented by hardware or software modules. These modules are referred to as TEE management modules in this specification. Generally, the TEE management module divides a program running mode into a normal world and a secure world (TEE world). Similarly, a physical memory of the system is divided into a common memory and a secure memory (also referred to as a trusted memory). Each secure memory page can only be held by one TEE instance. The CPU can access a secure memory held by a current TEE instance only when the CPU enters the TEE world.

In the TEE solution, the TEE management module needs to ensure that the secure memory can only be accessed by the TEE instance of a holder of the secure memory. The TEE management module controls a page table used by the normal world to ensure that a normal world program and a TEE instance cannot access, by querying a page table, a secure memory held by another TEE, and cannot generate a TLB that points to the secure memory.

Figure 1:
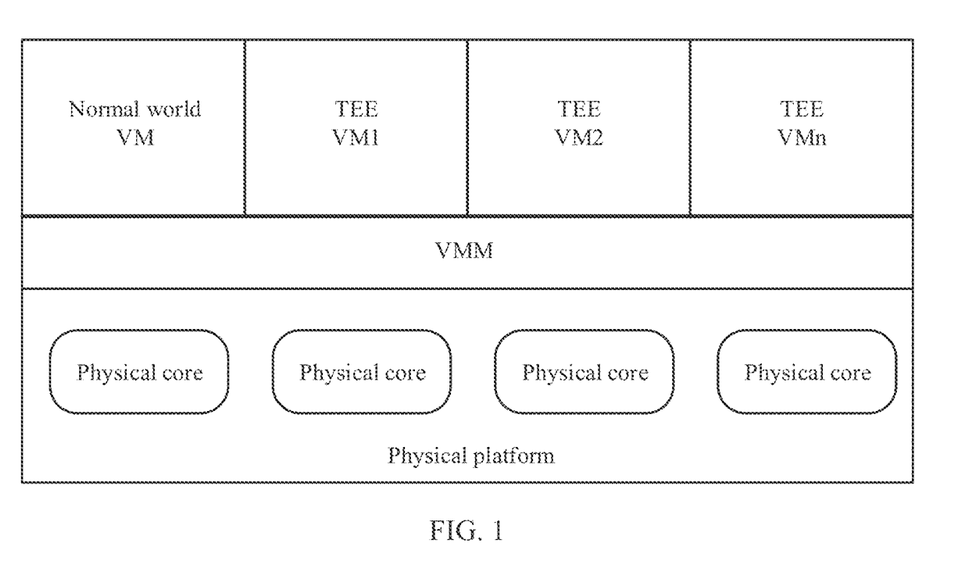
FIG. 1 is a schematic diagram illustrating an architecture of a virtualization system, according to some embodiments.

According to some implementations, a TEE environment is provided through virtualization, where each TEE instance runs in a virtual machine. FIG. 1 is a schematic diagram illustrating an architecture of a virtualization system, according to some embodiments. As shown in the figure, one physical platform can have a plurality of physical processors, i.e., a plurality of CPU cores. A virtual machine can be deployed on such a physical platform by using a virtual machine monitor (VMM) (or referred to as a hypervisor or a virtual machine manager) so as to be implemented as a virtualization platform. The virtual machine monitor runs in a highest permission mode, and the virtual machine runs in the VMM. Typically, a plurality of virtual machines can be deployed on one physical platform by using the virtual machine monitor.

According to the solutions in some embodiments of this specification, TEE instances and normal world programs run in different virtual machines (VMs). For example, in FIG. 1, a normal world VM running a common program, a TEE VM1 running a TEE instance 1, a TEE VM2 running a TEE instance 2, . . . , and a TEE VM n running a TEE instance n can be deployed using the virtual machine monitor. In the following descriptions, a virtual machine running a TEE instance is also referred to as a TEE virtual machine or a secure virtual machine, and an environment in which the virtual machine runs is referred to as a secure mode or a secure world. Transition between the normal world and the secure world is completed by switching VMs. The TEE management module runs in a host mode with a high privilege level. In the system architecture of FIG. 1, a function of the TEE management module is implemented by the virtual machine monitor.

Specifically, the virtual machine monitor restricts an access permission of the normal world program by controlling the access permission of the VM so as to provide a secure and reliable trusted execution environment for the TEE instance. In addition, the virtual machine monitor acting as the TEE management module can further ensure that for any TEE instance, another TEE instance and another secure world module cannot access a secure memory owned by the TEE instance, thereby providing privacy, integrity, and computational verifiability of data for the TEE instance.

In addition to control of a memory access permission, the system providing the TEE further needs to support a dynamic management operation of the secure memory. Typically, the management operation of the secure memory can include the following types of operations: a) dynamic swap-out, i.e., swapping out the secure memory to a common memory; b) dynamic deletion, for example, unbinding an address; and c) modifying a permission and a type of a memory page. In the following descriptions, the above-mentioned operations are collectively referred to as dynamic modification or management operation of a secure memory.

Unlike dynamic management of a common memory, the TEE solution typically designs different stages for the management operation of the secure memory, including the following three stages:
  (1) Apply for dynamic modification of the secure memory.
  (2) Clear outdated metadata such as a TLB cache for the secure memory.
  (3) Validate the dynamic modification of the secure memory.

For the operation of dynamic swap-out or deletion, after stage (3) is completed, a modified secure memory page becomes an idle page, and can be allocated to another TEE instance again. To ensure data security, metadata about a trusted memory, such as a resident TLB cache, need to be flushed in stage (2), disallowing an original TEE instance to be still capable of accessing these secure memories after stage (3). For the operation of type c), after the permission or type is dynamically modified, the outdated metadata about the secure memory, such as a TLB, also need to be cleared in stage (2). Otherwise, the new permission and type of the secure memory page cannot take effect after stage (3).

In conclusion, to ensure security of memory modification with respect to the TEE, and prevent the normal world and the TEE instance from maliciously accessing a secure memory of another TEE by using a secure memory mapping cache that resides in the TLB, in the TEE solution, TLB flushing needs to be performed before stage (3) to clear the secure memory mapping cache that resides in the TLB.

To this end, a TLB management solution is proposed in some embodiments of this specification. The solution includes at least the following two stages of improvement: a TLB flushing operation stage and a flushing verification stage. According to the solution in some embodiments, in the TLB flushing operation stage, each CPU core running the secure virtual machine can be facilitated to perform the TLB flushing operation. In the flushing verification stage, whether the TLB flushing operation is completed properly can be verified for the TEE instance related to the current memory modification, thereby further ensuring the validity of the secure memory management of the TEE.

Figure 2:
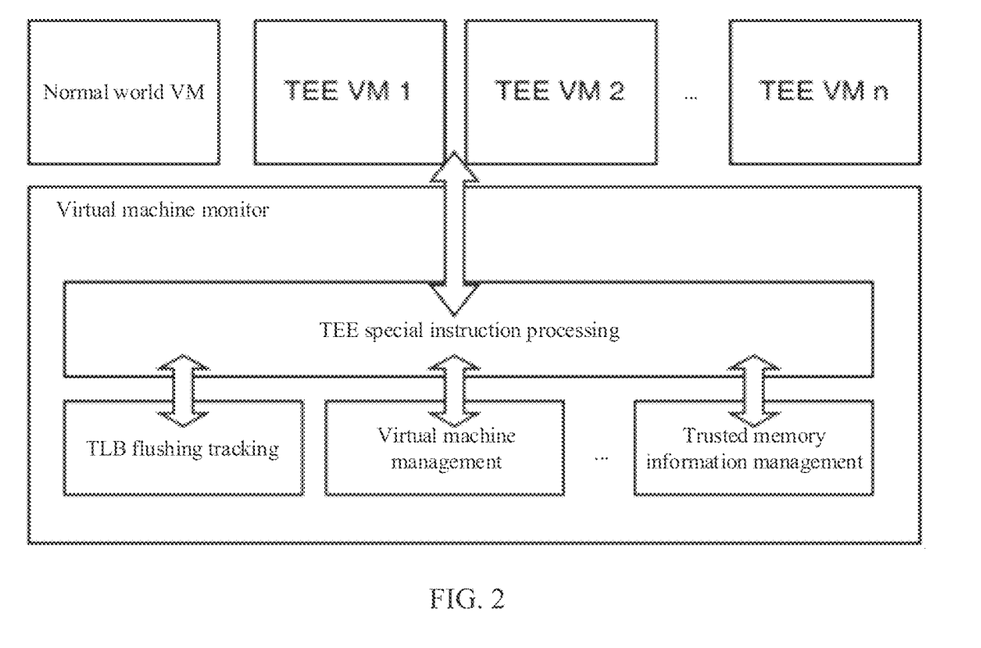
FIG. 2 is a schematic diagram illustrating an architecture for performing TLB management, according to some embodiments.

FIG. 2 is a schematic diagram illustrating an architecture for performing TLB management, according to some embodiments. As shown in FIG. 2, as a manager of an entire system, the virtual machine monitor (hypervisor) is divided into a plurality of apparatuses at a granularity of a module. A TEE special instruction processing module runs at an uppermost layer, and is responsible for interaction between the virtual machine monitor (hypervisor) and the virtual machine (VM). These TEE special instructions are used to manage an enclave corresponding to running of the TEE instance.

The TEE special instruction processing module interacts with a TLB flushing tracking module, a virtual machine management module, a trusted memory information management module, etc. at lower layers. According to the solution in some embodiments of this specification, the virtual machine management module implements the TLB flushing function, and the TLB flushing tracking module implements TLB flushing tracking and verification of a trusted environment. The TLB flushing tracking module is also briefly referred to as a tracking module in the following descriptions.

The following respectively describes a process of a TLB flushing operation and a process of a TLB flushing tracking and verification.

Figure 3:
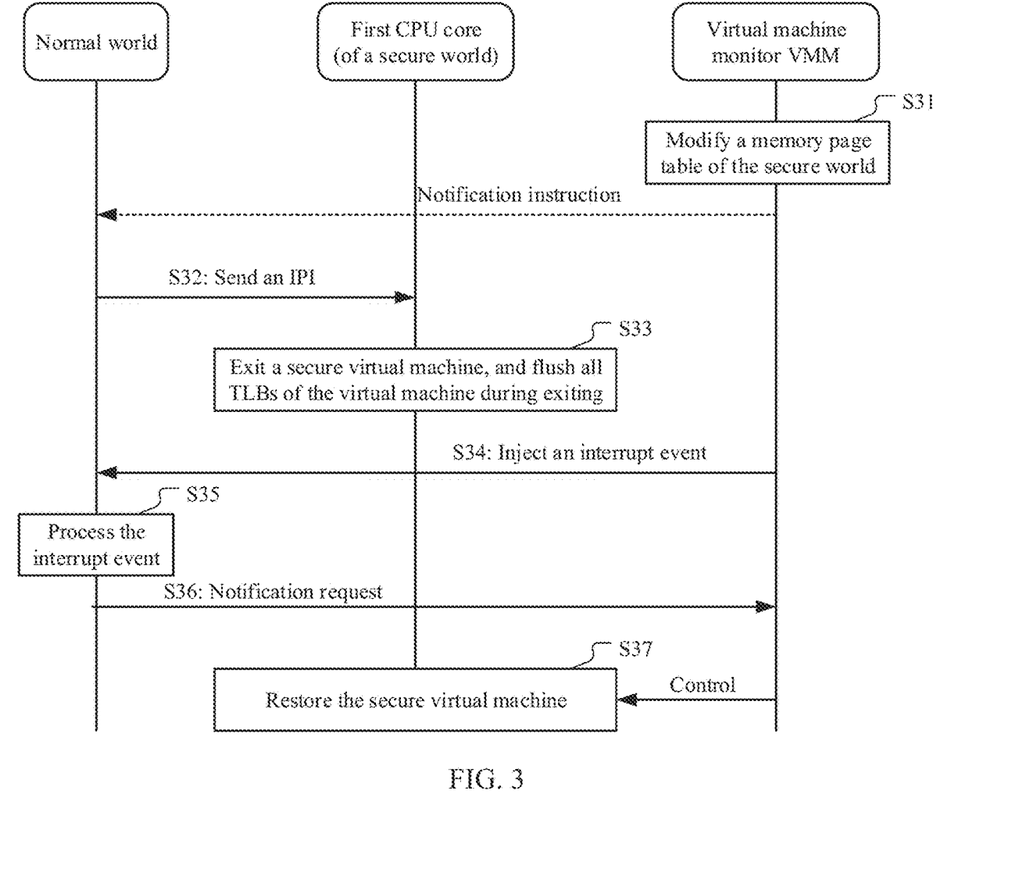
FIG. 3 shows a process of a TLB flushing operation.

FIG. 3 shows a process of a TLB flushing operation.

As described above, modifying the secure memory includes: dynamically swapping out the secure memory page, modifying a permission and a type of the secure memory page, etc. For dynamic swap-out of the secure memory page, since a physical resource allocation policy of the entire system is formulated by a system kernel of a normal world operating system, dynamic swap-out of the secure memory page is completed by the operating system kernel of the normal world. This type of memory modification request is applied for by the normal world operating system, and is transparent to the TEE. Subsequently, this type of modification operation is referred to as a modification operation that is transparent to the TEE or a first-type modification operation. However, for dynamic modification of a permission and a type of the secure memory page, the application is usually triggered internally by the TEE during TEE running based on needs of the TEE program. Therefore, these operations are not transparent to the TEE. Subsequently, this type of modification operation is referred to as a modification operation that is not transparent to the TEE or a second-type modification operation.

Therefore, for the first-type modification operation, the normal world operating system sends an application request for secure memory modification; for the second-type modification operation, the TEE instance sends an application request for memory modification. Because of involvement of secure memory modification, the application request causes the secure memory management module in the virtual machine monitor to modify the memory page table of the secure world. As shown in step S31 in FIG. 3, after the secure memory page table is modified, according to the solution in some embodiments of this specification, the virtual machine monitor can send an instruction or a notification to a virtual machine of the normal world. Therefore, in step S32, the normal world sends an inter-processor interrupt (IPI) to the CPU core running the TEE virtual machine. The normal world here can also be referred to as a common execution environment, and can be understood as a world formed by an operating system, a runtime environment, and hardware (a CPU core) as a whole in a common running mode.

The inter-processor interrupt (IPI) is a method in which a multi-core processor performs inter-processor communication, and one hardware thread (one CPU core) is allowed to interrupt another hardware thread. Generally, an initiator can write a message for desired communication into a shared memory, and then initiate an inter-processor interrupt (IPI). A receiver interrupts processing of the current thread and reads the shared memory to obtain the message notified by the initiator, thereby implementing a function of inter-processor communication.

The solution in some embodiments mainly uses the feature that the IPI causes another CPU core to interrupt, without paying attention to message content written into the shared memory.

It is worthwhile to note that, in step S32, the CPU core of the normal world sends an IPI to all CPU cores currently running the TEE virtual machine. For simplicity and clarity of illustration, FIG. 3 shows only the "first CPU core" as one of the CPU cores. Another CPU core running the TEE virtual machine performs a same operation as the first CPU.

In response to the IPI, in step S33, the first CPU core exits the running TEE virtual machine, i.e., exits a secure world or a secure mode, and flushes all TLB entries related to the TEE virtual machine during exiting.

Step S33 is performed depending on pre-configuration of control data of the TEE virtual machine by the virtual machine monitor. A virtualization technology generally supports configuration of control data for the virtual machine. The control data can indicate meta-information of the virtual machine, and control a method for running and exiting from the virtual machine, etc. For example, in a hardware-assisted virtual machine technology Intel VT based on an x86 architecture, a virtual machine control structure (VMCS) is defined, including content of a register related to the virtual machine CPU and control information related to the virtual machine. When entering into or exiting from a VM, the CPU queries and updates the VMCS. The virtual machine monitor can alternatively configure the VMCS by using an instruction, to manage a virtual processor. The hardware-assisted virtualization technology SVM of AMD defines a virtual machine control block (VMCB). The VMCB can be stored in a segment of a specific register corresponding to the CPU core. A function of the VMCB is similar to that of the VMCS, and a data structure of the VMCB includes a plurality of fields, which respectively indicate different control content.

The following uses the VMCB as an example for specific description. The VMCB includes a plurality of fields for controlling a virtual machine in different aspects. For example, some fields are used to control interception of various events or instructions that cause system state switching, some fields are used to control interruption of a virtual machine, and some fields are used to provide virtual machine exit information. The virtual machine exit information can include an event code that causes to exit from the virtual machine (VMEXIT), an abnormal or interrupted number, an intercepted instruction code, etc. The VMCB further includes a TLB control field, which can define a method for flushing the TLB when exiting from the virtual machine. For example, in a specific version of the VMCB, the TLB control field defines a code and a policy of the TLB flushing method, as shown in Table 1 below.

TABLE 1

| Code and policy in the TLB control field | |
|---|---|
| Code | Policy of flushing the TLB during VM switching |
| 00h | Do not flush the TLB |
| 01h | Flush all TLBs |
| 03h | Flush all local TLBs of this VM |
| 07h | Flush the global TLB of this VM |

In some embodiments of this specification, the virtual machine monitor can configure the control data of the TEE virtual machine such that the TEE virtual machine exits a guest mode after the TEE virtual machine receives an inter-processor interrupt of the CPU, and the hardware automatically flushes the TLB cache of the TEE virtual machine when exiting from the TEE virtual machine.

Specifically, based on the data structure of the VMCB, the virtual machine monitor can configure the VMCB corresponding to each TEE virtual machine. For example, the IPI is included in the virtual machine exit information, and a field value of the TLB control field is uniformly set to 03 h.

As such, based on the configuration of the VMCB, once the CPU core running the TEE virtual machine receives the inter-processor interrupt (IPI), exiting from the virtual machine occurs. In addition, with reference to the setting of the TLB field, the hardware flushes all TLB entries related to the TEE virtual machine.

As described above, after step S33 is performed, a conventional interrupt execution procedure continues. In step S34, the virtual machine monitor (acting as the TEE management module) injects an interrupt event into a normal world VM. In step S35, the normal world VM processes the interrupt event. As described above, the solution in some embodiments mainly uses the feature that the IPI causes the CPU core to interrupt, without paying attention to content of the interrupt event. Therefore, in step S35, interrupt event processing can be performed only once in terms of a form/program. After the interrupt processing is performed, in step S36, the normal world VM sends a notification to the virtual machine monitor to request the TEE management module (i.e., the virtual machine monitor) to enter the TEE virtual machine. Therefore, in step S37, the virtual machine monitor restores the first CPU core to a running state before the TEE virtual machine receives the interrupt.

Afterwards, if the TEE virtual machine accesses the secure memory, the secure page table needs to be queried. According to some embodiments of this specification, since TLB flushing has been performed in stage (2), dynamic modification of the secure memory can take effect in the page table in stage (3). Therefore, the TEE virtual machine can query a secure page table that has taken effect, thereby normally accessing the secure memory.

To verify that the normal world correctly performs a TLB flushing behavior, this specification further provides a tracking and verification solution for TLB flushing, and on this basis, a general solution for secure memory management is formed. In the solution in some embodiments of this specification, an overall process of secure memory management can be divided into four stages:

Stage 1: The normal world operating system or the TEE instance requests to modify the secure memory.
Stage 2: The virtual machine monitor starts TLB flushing tracking for the TEE.
Stage 3: The normal world initiates a TLB flushing operation by sending an inter-processor interrupt (IPI).
Stage 4: The virtual machine monitor verifies the TLB flushing, and validates the modification.

FIG. 3 corresponds to a specific execution process of stage 3. To ensure correct TLB flushing, in some embodiments of this specification, stage 2 is added before stage 3 to start TLB flushing tracking. Therefore, in an execution process of stage 3, a tracking process is continuously performed. In stage 4, the modification takes effect when it is verified, based on a tracking result, that the TLB is correctly flushed.

The following describes processes of starting and performing the tracking and verification.

As shown in FIG. 2, to track and verify TLB flushing, a TLB flushing tracking module is disposed in the virtual machine monitor. The tracking module respectively maintains one parameter group for each TEE instance, and dynamically updates a value of a parameter in the parameter group to track a process and a state of the TLB flushing.

Specifically, the parameter group maintained for each TEE instance includes a state parameter, and the state parameter is used to indicate whether TLB flushing is completed. In an initial state of starting the tracking, an initial value of the state parameter is set to FALSE to indicate that the flushing is not completed. After the tracking module is started, the tracking module continuously tracks switching of the secure world CPU core running the TEE virtual machine with respect to the secure mode. When it is determined that each CPU core running the TEE instance exits the secure mode corresponding to the TEE virtual machine at least once, the above-mentioned state parameter is set to TRUE to indicate that the flushing is completed. When detecting that the state parameter is TRUE, the virtual machine monitor determines that the verification succeeds such that modification of the secure memory takes effect (stage 4).

According to some embodiments, in order to explicitly indicate the state of the tracking module and ensure that the tracking module is not started repeatedly, a parameter indicating a startup state of the tracking module is maintained in the above-mentioned value of the parameter. The startup state parameter can be initially set to FALSE, indicating that start is not made. In addition, the tracking process can be started only when the startup state parameter is FALSE. Once the tracking process is started, the startup state parameter is set to TRUE.

As described above, the modification operation of the secure memory can include a first-type modification operation that is transparent to the TEE and a second-type modification operation that is not transparent to the TEE. To avoid inaccurate tracking that may be caused when a plurality of different types of modification operations are performed concurrently, according to some embodiments, the state parameter includes a first state parameter for the first-type modification operation and a second state parameter for the second-type modification operation. During TLB flushing tracking, based on whether a current application for secure memory modification is a first-type or a second-type modification operation, the first state parameter or the second state parameter is used to represent a flushing state.

Further, to better track switching of the secure world CPU core between the secure world and the normal world, one or more counting parameters and one or more core state parameters can be further introduced so as to count a quantity of CPU cores that further need to perform a flushing operation and assist in determining the above-mentioned state parameters.

The following provides detailed description with reference to a specific example.

Figure 4:
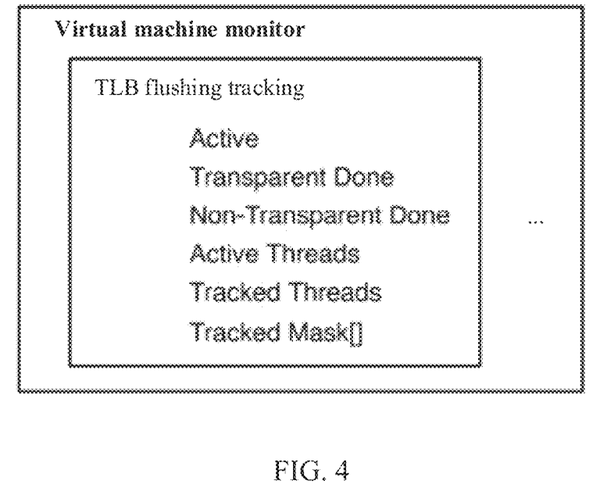
FIG. 4 shows an example of a parameter group maintained by a tracking module, according to some embodiments.

FIG. 4 shows an example of a parameter group maintained by a tracking module, according to some embodiments. In this example, the tracking module maintains the following parameter group for each TEE instance:

Active: A startup state parameter, used to indicate a startup state of a tracking process.
Transparent Done/Nontransparent Done: State parameters for the first-type modification/the second-type modification, used to indicate whether TLB flushing is completed.
Tracked Threads: Indicates a quantity of cores that need to perform TLB flushing.
Active Threads: Indicates a quantity of threads of this TEE instance that are currently running in a secure mode.
Tracked Masks: Indicates whether each CPU core needs to perform TLB flushing.

The following describes the process of updating and maintaining the above-mentioned parameter group.

Figure 5:
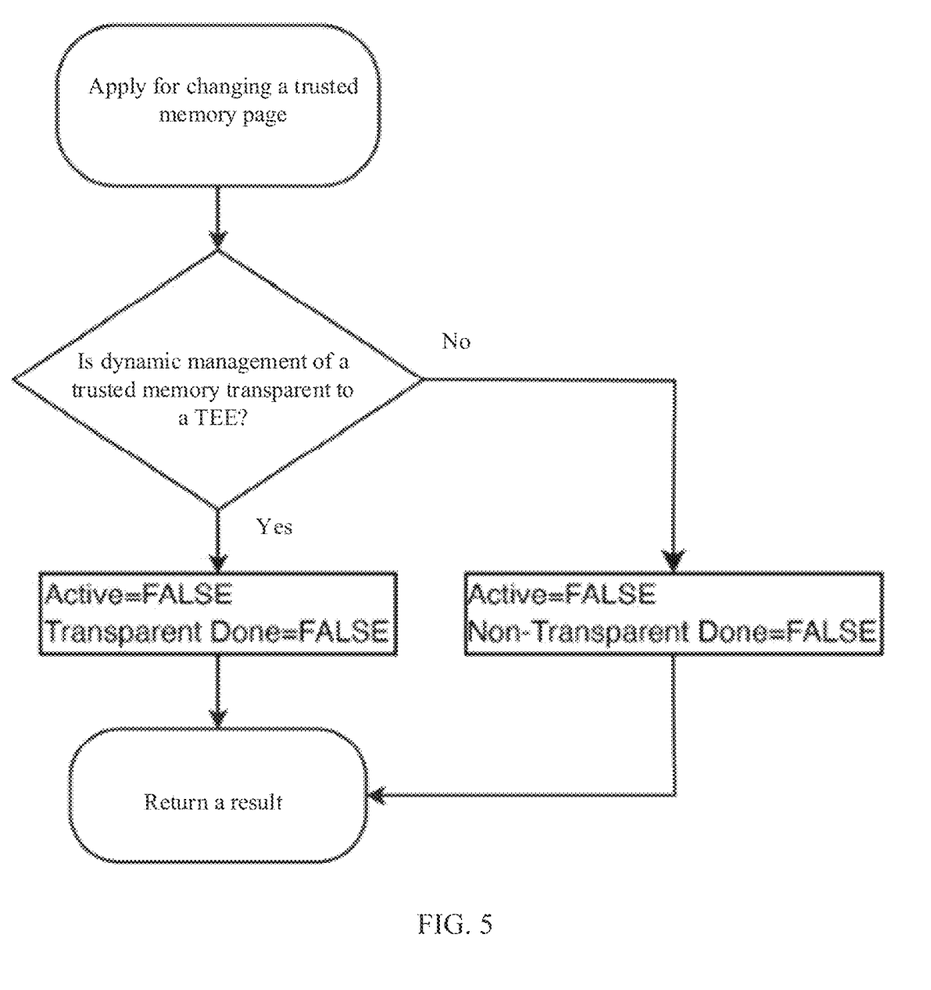
FIG. 5 shows a setting procedure before TLB flushing tracking is started.
Figure 6:
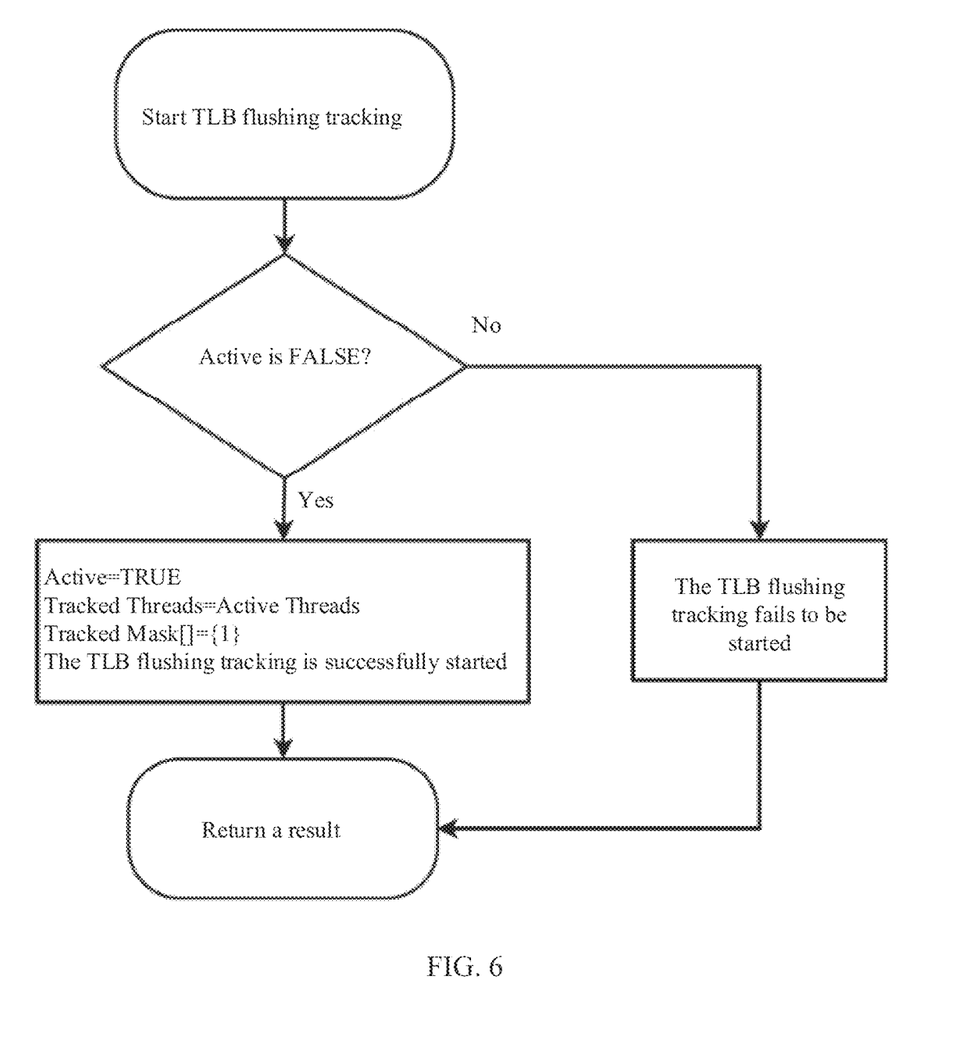
FIG. 6 is a schematic diagram illustrating a procedure for starting flushing tracking.

When an application request for modifying a secure memory is obtained (which may be initiated by a normal world or initiated by a TEE instance), the virtual machine monitor can determine a TEE instance related to a memory page that is currently requested to be modified. It is assumed that the current application for secure memory modification relates to a first TEE instance, and a parameter group maintained by the tracking module for the first TEE instance is referred to as a first parameter group. Before the virtual machine management module performs the TLB flushing process in FIG. 3, the processes in FIG. 5 and FIG. 6 are first performed in stage 2. FIG. 5 shows a setting procedure before TLB flushing tracking is started. FIG. 6 shows a procedure for starting the flushing tracking.

As shown in FIG. 5, in response to the application request for modifying the secure memory, the startup state parameter Active in the first parameter group corresponding to the first TEE instance can be set to FALSE to indicate that a tracking procedure has not been started. In addition, the corresponding state parameter is initialized based on the type of the memory modification. Specifically, if the secure memory modification is the first-type modification operation that is transparent to the TEE, the first state parameter Transparent Done in the first parameter group is set to FALSE; if the secure memory modification is the second-type modification operation that is not transparent to the TEE, the second state parameter NonTransparent Done in the first parameter group is set to FALSE. The first/second state parameter is set to FALSE, indicating that the corresponding TLB flushing is not completed.

Then, the procedure in FIG. 6 is performed, and a flushing tracking procedure is started. As shown in FIG. 6, when flushing tracking is started, it is first determined whether the startup state parameter Active is FALSE. If no, it indicates that the flushing tracking has been started. The current start is repeated start. In such case, the start fails. If the value of the parameter Active is FALSE, Active is first changed to TRUE, and other parameters in the first parameter group are initialized. Specifically, a quantity of threads Active Threads of the first TEE instance that are currently running in the secure mode is obtained, and Tracked Threads is initialized to be equal to the current Active Threads. In addition, Tracked Masks is further set. The Tracked Masks can include an array, and an $i^{th}$ element represents whether the $i^{th}$ CPU core needs to perform TLB flushing. In FIG. 6, an element Tracked Mask[i] corresponding to the CPU core i that currently runs the first TEE instance is set to 1, indicating that dirty data exist in the CPU core, and TLB flushing needs to be performed.

After the procedures in FIG. 5 and FIG. 6 are performed, the virtual machine monitor can enable the normal world to send an IPI to perform the procedure in FIG. 3. In a process of performing the procedure in FIG. 3, the tracking module in the virtual machine monitor continuously tracks switching (including exit/entry) of each secure world CPU core with respect to the secure world so as to update the above-mentioned first parameter group. Specifically, when any CPU core executing the first TEE instance, which is referred to as a core N below, switches between the normal world and the secure world, the tracking module performs the procedures in FIG. 7 and FIG. 8.

Figure 7:
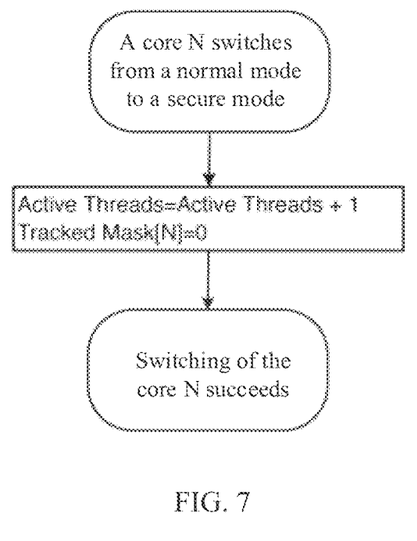
FIG. 7 shows a procedure for tracking switching of a core N from a normal world to a secure world.

As shown in FIG. 7, in response to that the core N switches from the normal world to the secure world, i.e., execution of the first TEE instance is resumed, the parameter Active Threads indicating the current quantity of threads is increased by 1. In addition, the Tracked Mask[N] corresponding to the core N is further set to 0, indicating that no dirty data exist in the CPU core, and that TLB flushing does not need to be performed. The reason is that the core N originally executing the first TEE instance switches back from the normal world to the secure world, which means that the CPU core certainly has experienced a process of exiting from the secure world to the normal world before. However, based on the setting of VMCB, exiting from the secure world leads to a TLB flushing operation. Therefore, when the core N switches back from the normal world to the secure world, the core N has already performed TLB flushing and no dirty data exist.

Figure 8:
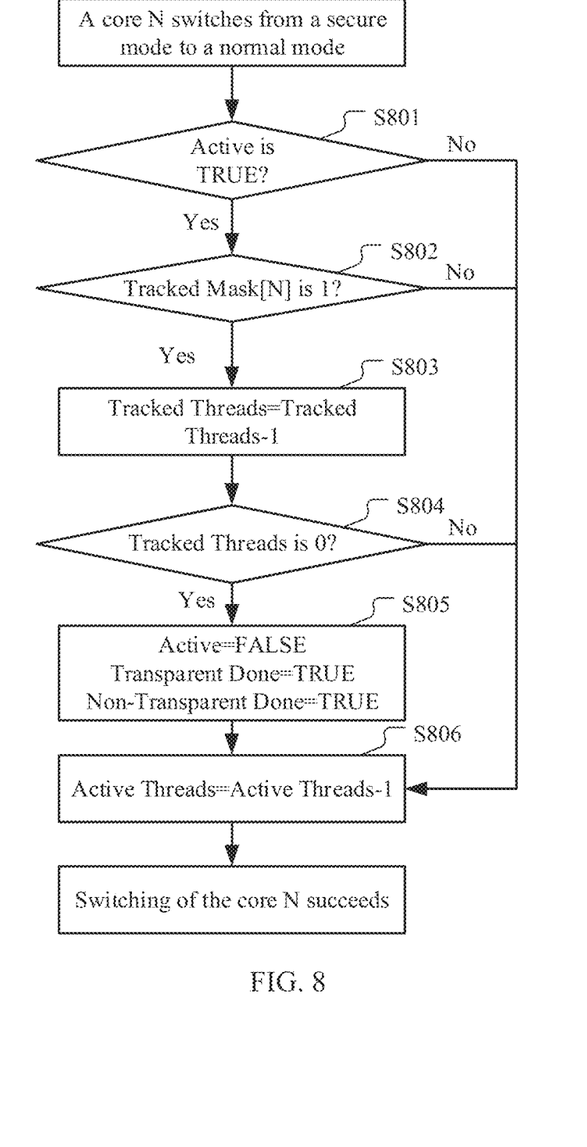
FIG. 8 shows a procedure for tracking switching of a core N from a secure world to a normal world.

As shown in FIG. 8, in response to that the core N switches from the secure world to the normal world, whether the parameter Active is TRUE is first checked in step S801, i.e., whether a tracking procedure is being started is determined. If the tracking procedure is not started, S806 is directly performed and the parameter Active Threads indicating the current quantity of threads is decreased by 1. If the tracking procedure is being started, step S802 is performed to continue to perform determination.

In step S802, whether the core state parameter Tracked Mask[N] corresponding to the core N is 1 is determined. If the core state parameter Tracked Mask[N] is not 1, it indicates that TLB flushing does not need to be performed (which further indicates that in the tracking process, it is not the first time for the core N to exit the secure world), and S806 is performed. If Tracked Mask[N] is 1, it indicates that TLB flushing needs to be performed (which further indicates that it is the first time for the core N to exit the secure world). Therefore, in step S803, the parameter Tracked Threads is decreased by 1.

Then, in step S804, whether Tracked Threads is 0 is determined. As described above, the parameter Tracked Threads indicates the quantity of cores that are to perform TLB flushing. When the quantity is 0, it means that all CPU cores that should perform TLB flushing have performed TLB flushing. Therefore, in step S805, Active is set to FALSE so as to end the current tracking procedure, and the corresponding state parameter Transparent Done/Nontransparent Done is set to TRUE, indicating that TLB flushing is completed. Then, step S806 is performed, and Active Threads is decreased by 1. If a determining result in S804 indicates that Tracked Threads is not 0, step S806 is also performed.

In conclusion, in FIG. 8, in response to that the core N exits the secure mode, if Tracked Mask[N] is 1, Tracked Threads and Active Threads are both decreased by 1 in steps S803 and S806, respectively. If Tracked Mask[N] is 0, only Active Threads is decreased by 1 (Tracked Threads remains unchanged).

It can be understood that the value of Tracked Threads is continuously updated by monitoring and tracking switching of each CPU core running the first TEE instance with respect to the secure mode. When a specific CPU core exits the secure mode, as shown in steps S804-S805 in FIG. 8, the value of Tracked Threads is decreased to 0. In such case, the state parameter is set to TRUE, indicating that TLB flushing is completed.

In stage 4, the virtual machine monitor reads the first or second state parameter Transparent Done/Nontransparent Done based on whether the current memory modification is the first-type modification or the second-type modification, and determines whether a value of the parameter is TRUE. When the state parameter is TRUE, the verification succeeds. In such case, the current secure memory modification takes effect.

The following describes a TLB flushing tracking process with reference to a specific example.

Figure 9:
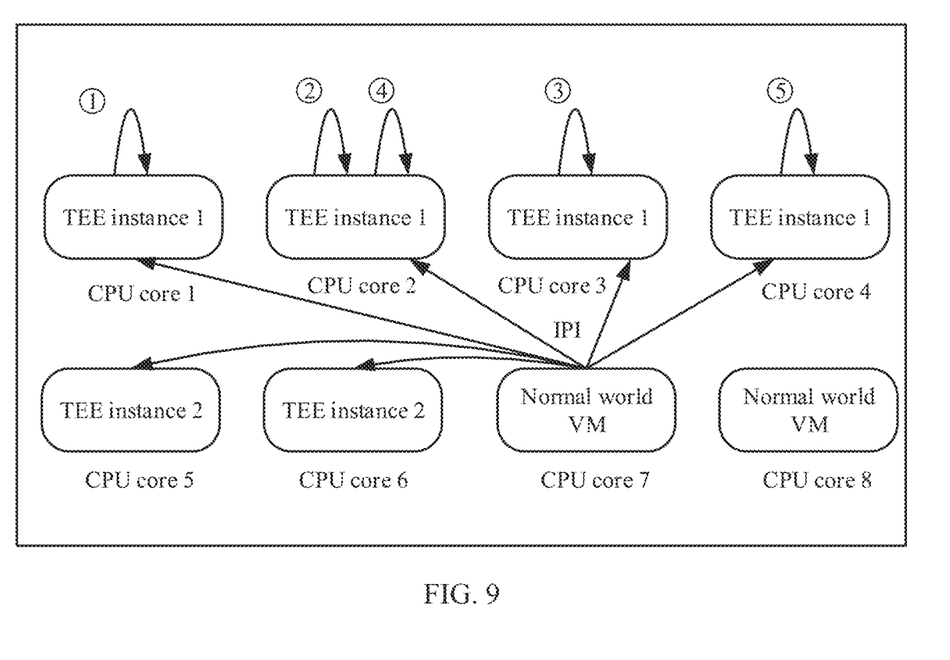
FIG. 9 shows an example of a multi-core system.

FIG. 9 shows an example of a multi-core system. In this example, a hardware platform has eight CPU cores, which are respectively denoted as CPU core 1, core 2, . . . , and core 8. Based on the hardware platform, a common virtual machine running a normal world, a TEE VM1 running a TEE instance 1, and a TEE VM2 running a TEE instance 2 are deployed using a virtual machine monitor. It is assumed that at a specific moment, core 1 to core 4 run the TEE instance 1, core 5 and core 6 run the TEE instance 2, and core 7 and core 8 run the normal world VM, as shown in FIG. 9.

Based on the multi-core system shown in FIG. 9, it is assumed that in stage 1, an application for secure memory modification is generated, and the modification relates to the TEE instance 1. Therefore, in stage 2, the virtual machine monitor starts TLB flushing tracking for the TEE instance 1. Specifically, based on the procedure in FIG. 5, Active in the parameter group P1 corresponding to the TEE instance 1 is set to FALSE, and the state parameter Transparent Done/Nontransparent Done corresponding to the type of the modification is set to FALSE. Then, according to FIG. 6, the tracking procedure is started to set Active to TRUE, and initialize other parameters in P1.

Specifically, during initialization, since core 1 to core 4 all run the TEE instance 1, Tracked Threads and Active Threads are both set to 4. In addition, Tracked Mask[1,2,3,4] corresponding to core 1 to core 4 are all set to 1.

Then, stage 3 is entered, and switching of each CPU core with respect to the secure mode is continuously tracked.

As shown in FIG. 9, in stage 3, core 7 running the normal world VM sends an IPI to all of core 1 to core 6 running the TEE virtual machine. Correspondingly, core 1 to core 6 all perform exiting of the secure virtual machine and flushing of the TLB. Core 1 to core 4 are CPU cores running the TEE instance 1, and switching states of these CPU cores trigger an update of the parameter group P1.

It is assumed that in stage 3, core 1, core 2, and core 3 successively exit the secure virtual machine, and then switch back from the normal world to the secure world, as shown in steps ①, ②, and ③ in FIG. 9. Next, because of another abnormality, core 2 switches from the secure world to the normal world again, as shown in step ④. Finally, core 4 exits the secure virtual machine, as shown in step ⑤. The following describes a process of changing a parameter in the parameter group P1 in the above-mentioned process.

In step ①, the procedure shown in FIG. 8 is performed in response to that core 1 switches from the secure mode to the normal mode. Tracked Mask[1] is 1. Therefore, Tracked Threads is decreased by 1 and updated to 3. Active Threads is also decreased by 1 and updated to 3. Then, core 1 switches back from the normal mode to the secure mode. As shown in FIG. 7, Active Threads is increased by 1 and updated to 4, and Tracked Mask[1] is set to 0.

In step ②, the procedure shown in FIG. 8 is performed in response to that core 2 switches from the secure mode to the normal mode. Tracked Mask[2] is 1. Therefore, Tracked Threads is decreased by 1 and updated to 2. Active Threads is decreased by 1 and updated to 3. Then, core 2 switches back from the normal mode to the secure mode. As shown in FIG. 7, Active Threads is increased by 1 and updated to 4, and Tracked Mask[2] is set to 0.

Step ③ is similar to the above-mentioned description. After step ③ is performed, Tracked Threads is updated to 1. After core 3 switches back from the normal world to the secure world, Active Threads is still 4, and Tracked Mask[3] is 0.

Then, in step ④, core 2 switches from the secure world to the normal world again, and the procedure shown in FIG. 8 is performed. In such case, Tracked Mask[2] is 0. This means that during tracking, it is not the first time for core 2 to exit the secure virtual machine, and therefore has performed TLB flushing. Tracked Threads remains unchanged and is still 1. Only Active Threads is decreased by 1.

Then, in step ⑤, the procedure shown in FIG. 8 is performed in response to that core 4 switches from the secure mode to the normal mode. Tracked Mask[4] is 1. Therefore, Tracked Threads is decreased by 1. In such case, Tracked Threads becomes 0. Therefore, in step S805 in FIG. 8, Active is changed to FALSE, and the corresponding state parameter Transparent Done/Nontransparent Done is set to TRUE. In addition, Active Threads is also decreased by 1 for subsequent maintenance.

Therefore, in stage 4, the virtual machine monitor determines that the verification succeeds by determining that the state parameter Transparent Done/Nontransparent Done is TRUE such that the current memory modification takes effect.

Recall the above-mentioned process. The tracking module tracks a world switching state of a secure world CPU so as to ensure that in a tracking interval, a world switching occurs at least once on each secure world CPU that runs the current TEE. However, as shown in FIG. 3, whenever the CPU core exits the secure world, TLB flushing is performed. Therefore, the tracking module tracks the world switching of the CPU core to ensure that the corresponding CPU core correctly performs TLB flushing. In addition, since the first-type modification operation and the second-type modification operation are respectively tracked, it is ensured that correctness of the TLB flushing mechanism is not affected when the dynamic memory modification operations are performed concurrently.

It should be understood that values such as FALSE, TRUE, 1, and 0 of the parameter of the above-mentioned parameter group are merely intended to indicate and distinguish different states. In other examples, another indication value can be used based on needs without departing from the technical concept of the above-mentioned embodiments.

In addition, corresponding to the above-mentioned method process, some embodiments of this specification further disclose a computing device. The computing device is deployed with a plurality of virtual machines by using a virtual machine monitor, and the plurality of virtual machines include a common virtual machine running a common execution environment and a secure virtual machine running a TEE instance. The computing device has a plurality of CPU cores. In the computing device, the common virtual machine is configured to: in response to a target request for modifying a secure memory, send an inter-processor interrupt (IPI) to one or more CPU cores that run the secure virtual machine, where control data corresponding to the secure virtual machine include a TLB control field, the TLB control field is set to a target value, and the target value indicates that all TLBs of the virtual machine are flushed when the secure virtual machine exits; and the one or more CPU cores are configured to: in response to the IPI, exit from a secure mode in which the secure virtual machine runs, and flush all TLBs of the corresponding virtual machine based on an indication of the target value.

According to some implementations, the target request relates to a first TEE instance. The virtual machine monitor includes a tracking module, and the tracking module maintains a first parameter group corresponding to the first TEE instance, where the first parameter group includes a state parameter used to indicate whether TLB flushing is completed. In addition, the tracking module is configured to: in response to the target request, update the first parameter group by tracking switching of the one or more CPU cores with respect to the secure mode; and the virtual machine monitor is configured to: verify whether the state parameter has a first value, and when the verification succeeds, validate memory modification corresponding to the target request.

According to some embodiments in yet another aspect, a computing device is further provided, including a storage device and a processor, where the storage device stores executable code, and the processor executes the executable code to implement the above-mentioned method for managing a TLB.

A person skilled in the art should be aware that in the above-mentioned one or more examples, functions described in this application can be implemented by hardware, software, firmware, or any combination thereof. When these functions are implemented by software, they can be stored in a computer-readable medium or transmitted as one or more instructions or code on the computer-readable medium.

The above-mentioned specific implementations further describe the purposes, technical solutions, and beneficial effects of this application. It should be understood that the above-mentioned descriptions are merely some specific implementations of this application and are not intended to limit the protection scope of this application. Any modification, equivalent replacement, or improvement made based on the technical solutions of this application shall fall within the protection scope of this application.

What is claimed is:

1. A method for managing a translation lookaside buffer (TLB) in a computing device, wherein the computing device is deployed with a plurality of virtual machines by using a virtual machine monitor, the plurality of virtual machines comprise a common virtual machine running a common execution environment and a secure virtual machine running a trusted execution environment (TEE) instance, and the computing device has a plurality of central process unit (CPU) cores; and the method comprises:
in response to a target request for modifying a secure memory, sending, by the common execution environment, an inter-processor interrupt (IPI) to one or more CPU cores that run the secure virtual machine, wherein control data corresponding to the secure virtual machine comprise a TLB control field, the TLB control field is set to a target value, and the target value indicates that all TLBs of the secure virtual machine are flushed when exiting from the secure virtual machine; and
in response to the IPI, exiting, by the one or more CPU cores, from a secure mode in which the secure virtual machine runs, and flushing all TLBs of the secure virtual machine based on the target value,
wherein the target request relates to a first TEE instance, the virtual machine monitor comprises a tracking module, and the tracking module maintains a first parameter group corresponding to the first TEE instance, wherein the first parameter group comprises a state parameter that indicates whether TLB flushing is completed; and the method further comprises:
in response to the target request, updating, by the tracking module, the first parameter group by tracking switching of the one or more CPU cores with respect to the secure mode; and
verifying, by the virtual machine monitor, whether the state parameter has a first value, and in response to that the verification succeeds, validating memory modification corresponding to the target request, wherein the first value indicates that TLB flushing is completed.

2. The method according to claim 1, wherein the control data are virtual machine control block (VMCB) data stored in a register corresponding to a CPU core.

3. The method according to claim 1, wherein the control data comprise virtual machine exit information, the virtual machine exit information indicates an event that causes the exiting from the secure virtual machine, and the virtual machine exit information is set to comprise the IPI.

4. The method according to claim 1, before the sending, by the common execution environment, an inter-processor interrupt (IPI) to one or more CPU cores that run the secure virtual machine, further comprising:
in response to the target request, setting, by the virtual machine monitor, a startup state for the first TEE instance to a first state indicating that start is not made, and setting the state parameter to a second value, wherein the second value indicates that TLB flushing is not completed.

5. The method according to claim 4, before the sending, by the common execution environment, an inter-processor interrupt (IPI) to one or more CPU cores that run the secure virtual machine, further comprising:
in response to that the startup state is the first state, changing, by the virtual machine monitor, the startup state to a second state indicating that start is made, and initializing the first parameter group.

6. The method according to claim 1, wherein the first parameter group further comprises a first parameter indicating a quantity of CPU cores to perform TLB flushing, and the first parameter is initially set to be equal to a quantity of threads of the first TEE instance that run in the secure mode at that time; and
the updating the first parameter group comprises:
updating the first parameter in response to switching of a target CPU core with respect to the secure mode, wherein the target CPU core is a CPU core running the first TEE instance among the one or more CPU cores; and
setting the state parameter to the first value in response to that the first parameter is updated to 0.

7. The method according to claim 6, wherein the first parameter group further comprises a second parameter indicating whether the target CPU core needs to perform TLB flushing, and wherein an initial value of the second parameter is a third value indicating that flushing needs to be performed.

8. The method according to claim 7, wherein the updating the first parameter comprises:
in response to that the target CPU core exits the secure mode, decreasing each of a value of the first parameter and the quantity of threads by 1 if a current value of the second parameter is the third value; otherwise, retaining the value of the first parameter and decreasing the quantity of threads by 1.

9. The method according to claim 7, wherein the updating the first parameter comprises:
in response to that the target CPU core switches to the secure mode, increasing the quantity of threads by 1, and setting the second parameter to a fourth value, wherein the fourth value indicates that flushing does not need to be performed.

10. The method according to claim 1, wherein the state parameter comprises a first state parameter corresponding to first-type memory modification, and a second state parameter corresponding to second-type memory modification, and the first-type memory modification and the second-type memory modification respectively correspond to memory modification initiated by a normal world operating system and memory modification initiated by a TEE instance.

11. The method according to claim 10, wherein the verifying, by the virtual machine monitor, whether the state parameter has a first value comprises:
if the target request relates to the first-type memory modification, verifying whether the first state parameter has the first value; and
if the target request relates to the second-type memory modification, verifying whether the second state parameter has the first value.

12. A computing device, wherein the computing device is deployed with a plurality of virtual machines by using a virtual machine monitor, the plurality of virtual machines comprise a common virtual machine running a common execution environment and a secure virtual machine running a TEE instance, and the computing device has a plurality of CPU cores;
the common virtual machine is configured to: in response to a target request for modifying a secure memory, send an inter-processor interrupt (IPI) to one or more CPU cores that run the secure virtual machine, wherein control data corresponding to the secure virtual machine comprise a TLB control field, the TLB control field is set to a target value, and the target value indicates that all TLBs of the secure virtual machine are flushed when exiting from the secure virtual machine; and
the one or more CPU cores are configured to: in response to the IPI, exit from a secure mode in which the secure virtual machine runs, and flush all TLBs of the secure virtual machine based on an indication of the target value,
wherein the target request relates to a first TEE instance, the virtual machine monitor comprises a tracking module, and the tracking module maintains a first parameter group corresponding to the first TEE instance, wherein the first parameter group comprises a state parameter used to indicate whether TLB flushing is completed;
the tracking module is configured to: in response to the target request, update the first parameter group by tracking switching of the one or more CPU cores with respect to the secure mode; and
the virtual machine monitor is configured to: perform a verification whether the state parameter has a first value, and in response to that the verification succeeds, validate memory modification corresponding to the target request, wherein the first value indicates that TLB flushing is completed.

13. The computing device according to claim 12, wherein the state parameter comprises a first state parameter corresponding to first-type memory modification, and a second state parameter corresponding to second-type memory modification, and the first-type memory modification and the second-type memory modification respectively correspond to memory modification initiated by a normal world operating system and memory modification initiated by a TEE instance.

14. The computing device according to claim 12, wherein, before the common virtual machine sends the IPI to the one or more CPU cores that run the secure virtual machine, the virtual machine monitor is configured to:
in response to the target request, set a startup state for the first TEE instance to a first state indicating that start is not made, and set the state parameter to a second value, wherein the second value indicates that TLB flushing is not completed.

15. The computing device according to claim 14, wherein, before the common execution environment sends the IPI to the one or more CPU cores that run the secure virtual machine, the virtual machine monitor is configured to:
in response to that the startup state is the first state, change the startup state to a second state indicating that start is made, and initialize the first parameter group.

16. The computing device according to claim 12, wherein the first parameter group further comprises a first parameter indicating a quantity of CPU cores to perform TLB flushing, and the first parameter is initially set to be equal to a quantity of threads of the first TEE instance that run in the secure mode at that time; and
the tracking module is configured to update the first parameter group by operations comprising:
updating the first parameter in response to switching of a target CPU core with respect to the secure mode, wherein the target CPU core is a CPU core running the first TEE instance among the one or more CPU cores; and
setting the state parameter to the first value in response to that the first parameter is updated to 0.

17. The computing device according to claim 16, wherein the first parameter group further comprises a second parameter indicating whether the target CPU core needs to perform TLB flushing, and wherein an initial value of the second parameter is a third value indicating that flushing needs to be performed.

18. The computing device according to claim 12, wherein the control data are virtual machine control block (VMCB) data stored in a register corresponding to a CPU core.

19. The computing device according to claim 12, wherein the control data comprise virtual machine exit information, the virtual machine exit information indicates an event that causes the exiting from the secure virtual machine, and the virtual machine exit information is set to comprise the IPI.

20. A non-transitory, computer-readable medium storing one or more instructions executable by a computer system to perform operations for managing a translation lookaside buffer (TLB) in a computing device, wherein the computing device is deployed with a plurality of virtual machines by using a virtual machine monitor, the plurality of virtual machines comprise a common virtual machine running a common execution environment and a secure virtual machine running a trusted execution environment (TEE) instance, and the computing device has a plurality of central process unit (CPU) cores; and the operations comprise:
in response to a target request for modifying a secure memory, sending, by the common execution environment, an inter-processor interrupt (IPI) to one or more CPU cores that run the secure virtual machine, wherein control data corresponding to the secure virtual machine comprise a TLB control field, the TLB control field is set to a target value, and the target value indicates that all TLBs of the secure virtual machine are flushed when exiting from the secure virtual machine; and
in response to the IPI, exiting, by the one or more CPU cores, from a secure mode in which the secure virtual machine runs, and flushing all TLBs of the secure virtual machine based on the target value,
wherein the target request relates to a first TEE instance, the virtual machine monitor comprises a tracking module, and the tracking module maintains a first parameter group corresponding to the first TEE instance, wherein the first parameter group comprises a state parameter that indicates whether TLB flushing is completed; and the operations further comprise:

in response to the target request, updating, by the tracking module, the first parameter group by tracking switching of the one or more CPU cores with respect to the secure mode; and verifying, by the virtual machine monitor, whether the state parameter has a first value, and in response to that the verification succeeds, validating memory modification corresponding to the target request, wherein the first value indicates that TLB flushing is completed.

\* \* \* \* \*